United States Patent
Chen et al.

(10) Patent No.: US 8,452,029 B2
(45) Date of Patent: May 28, 2013

(54) AUDIO SYSTEM, ELECTRONIC DEVICE AND CAR AUDIO SYSTEM

(75) Inventors: Chien-Chou Chen, Taipei County (TW); Wen-Kang Wei, Taipei County (TW)

(73) Assignee: AmTRAN TECHNOLOGY Co., Ltd., New Taipei (TW)

( * ) Notice: Subject to any disclaimer, the term of this patent is extended or adjusted under 35 U.S.C. 154(b) by 823 days.

(21) Appl. No.: 12/581,898

(22) Filed: Oct. 20, 2009

(65) Prior Publication Data
US 2011/0037897 A1      Feb. 17, 2011

(30) Foreign Application Priority Data

Aug. 17, 2009   (TW) ................................ 98127602 A

(51) Int. Cl.
*H04B 1/00* (2006.01)
(52) U.S. Cl.
USPC .............................. 381/119; 381/86; 381/94.1
(58) Field of Classification Search
USPC .................. 381/77, 71.11, 71.6, 71.1, 74, 93, 381/57, 120, 119, 111, 104, 94.1, 86; 700/94
See application file for complete search history.

(56) References Cited

U.S. PATENT DOCUMENTS

| | | | |
|---|---|---|---|
| RE38,142 E * | 6/2003 | Berry et al. ...................... | 725/77 |
| 2008/0063215 A1* | 3/2008 | Porwal et al. .................... | 381/77 |
| 2008/0247560 A1* | 10/2008 | Fukuda et al. ................ | 381/71.6 |
| 2008/0319564 A1* | 12/2008 | Furge et al. ...................... | 700/94 |
| 2009/0046867 A1* | 2/2009 | Clemow ........................ | 381/71.6 |

FOREIGN PATENT DOCUMENTS

| | | |
|---|---|---|
| CN | 1128445 | 8/1996 |
| CN | 1391762 | 1/2003 |
| CN | 2602571 | 2/2004 |
| CN | 201001101 | 1/2008 |
| CN | 201123123 | 9/2008 |

OTHER PUBLICATIONS

"First Office Action of China counterpart application" issued on Jan. 29, 2013, p1-p11, in which the listed references were cited.

* cited by examiner

*Primary Examiner* — Vivian Chin
*Assistant Examiner* — Friedrich W Fahnert
(74) *Attorney, Agent, or Firm* — Jianq Chyun IP Office

(57) ABSTRACT

An audio system including an inverter, a first amplifier, a first mixer, a main speaker, and a first audio output port is provided. The inverter receives a first audio signal and inverts the first audio signal into an inverted audio signal. The first amplifier receives the inverted audio signal from the inverter and multiplies the inverted audio signal by a first gain to generate a first compensating audio signal. The first mixer receives a second audio signal and mixes the first compensating audio signal with the second audio signal to generate a first low-interference audio signal. The main speaker receives and plays the first audio signal. The first audio output port receives the first low-interference audio signal from the first mixer and transmits the first low-interference audio signal to a first external speaker. An electronic device and a car audio system capable of generating the low-interference audio signal are provided.

14 Claims, 7 Drawing Sheets

AUDIO SYSTEM, ELECTRONIC DEVICE AND CAR AUDIO SYSTEM

CROSS-REFERENCE TO RELATED APPLICATION

This application claims the priority benefit of Taiwan application Ser. No. 98127602, filed on Aug. 17, 2009. The entirety of the above-mentioned patent application is hereby incorporated by reference herein and made a part of this specification.

BACKGROUND OF THE INVENTION

1. Field of the Invention

The present invention generally relates to an audio system, an electronic device, and a car audio system, and more particularly, to an audio system, an electronic device, and a car audio system for reducing interference.

2. Description of Related Art

In recent years, such application as playing multiple channels selected by a user as picture in picture (PIP) in a TV or opening multiple windows in a computer for simultaneously playing multiple movies or music has become very popular. Through such an application, multiple users can watch different movies or listen to different music at the same time by using the same TV or computer screen.

FIG. 1 is a diagram of a conventional TV. Referring to FIG. 1, the TV 100 can simultaneously play two video signals. The speaker 110 of the TV 100 plays an audio signal corresponding to the first video signal, and an earphone 120 connected to the TV 100 plays an audio signal corresponding to the second video signal. However, the earphone 120 cannot completely isolate the outside sound and accordingly the user of the earphone 120 will be interfered by the sound played by the speaker 110. Thereby, a technique for reducing the interference from the speaker of the TV to the earphone is desired.

SUMMARY OF THE INVENTION

Accordingly, the present invention is directed to an audio system which can reduce interference between different audio signals.

The present invention is also directed to an electronic device, wherein an audio system of the electronic device can reduce interference between different audio signals.

The present invention is further directed to a car audio system which can reduce the interference of traffic noises.

The present invention provides an audio system including an inverter, a first amplifier, a first mixer, a main speaker, and a first audio output port. The inverter receives a first audio signal and inverts the first audio signal into an inverted audio signal. The first amplifier receives the inverted audio signal from the inverter and multiplies the inverted audio signal by a first gain to generate a first compensating audio signal. The first mixer receives a second audio signal and mixes the first compensating audio signal with the second audio signal to generate a first low-interference audio signal. The main speaker receives and plays the first audio signal. The first audio output port receives the first low-interference audio signal from the first mixer and transmits the first low-interference audio signal to a first external speaker.

In an embodiment of the audio system according to the present invention, the first external speaker is an earphone.

In an embodiment of the audio system according to the present invention, the audio system further includes a second amplifier, a second mixer, and a second audio output port. The second amplifier receives the inverted audio signal from the inverter and multiplies the inverted audio signal by a second gain to generate a second compensating audio signal. The second mixer receives a third audio signal and mixes the second compensating audio signal with the third audio signal to generate a second low-interference audio signal. The second audio output port receives the second low-interference audio signal from the second mixer and transmits the second low-interference audio signal to a second external speaker, wherein the second external speaker may be an earphone.

In an embodiment of the audio system according to the present invention, the audio system further includes a controller having an audio receiving unit, wherein the audio receiving unit receives the first audio signal played by the main speaker, and the controller changes the first gain according to the volume of the first audio signal received by the audio receiving unit.

In an embodiment of the audio system according to the present invention, the audio system further includes a controller, wherein a user uses the controller to change the first gain.

The present invention also provides an electronic device including a display unit and an audio system. The display unit displays a first video signal. The audio system includes an inverter, a first amplifier, a first mixer, a main speaker, and a first audio output port. The inverter receives a first audio signal corresponding to the first video signal and inverts the first audio signal into an inverted audio signal. The first amplifier receives the inverted audio signal from the inverter and multiplies the inverted audio signal by a first gain to generate a first compensating audio signal. The first mixer receives a second audio signal and mixes the first compensating audio signal with the second audio signal to generate a first low-interference audio signal. The main speaker receives and plays the first audio signal. The first audio output port receives the first low-interference audio signal from the first mixer and transmits the first low-interference audio signal to a first external speaker.

In an embodiment of the electronic device according to the present invention, the first external speaker is an earphone.

In an embodiment of the electronic device according to the present invention, the audio system further includes a second amplifier, a second mixer, and a second audio output port. The second amplifier receives the inverted audio signal from the inverter and multiplies the inverted audio signal by a second gain to generate a second compensating audio signal. The second mixer receives a third audio signal and mixes the second compensating audio signal with the third audio signal to generate a second low-interference audio signal. The second audio output port receives the second low-interference audio signal from the second mixer and transmits the second low-interference audio signal to a second external speaker, wherein the second external speaker may be an earphone.

In an embodiment of the electronic device according to the present invention, the audio system further includes a controller having an audio receiving unit, wherein the audio receiving unit receives the first audio signal played by the main speaker, and the controller changes the first gain according to the volume of the first audio signal received by the audio receiving unit.

In an embodiment of the electronic device according to the present invention, the audio system further includes a controller, wherein a user uses the controller to change the first gain.

In an embodiment of the electronic device according to the present invention, the electronic device further includes a tuner. The tuner receives a television signal from a signal source. The television signal contains the first video signal, the first audio signal, a second video signal, and the second audio signal, wherein the second video signal is corresponding to the second audio signal, and the display unit simultaneously displays the first video signal and the second video signal.

In an embodiment of the electronic device according to the present invention, the electronic device further includes a computer system for generating the first video signal, the first audio signal, and the second audio signal. Besides, the computer system further generates a second video signal corresponding to the second audio signal, and the display unit simultaneously displays the first video signal and the second video signal. In addition, the electronic device may further include a first video output port. The computer system further generates a second video signal corresponding to the second audio signal. The first video output port receives the second video signal from the computer system and transmits the second video signal to a first external display.

The present invention further provides a car audio system suitable for being disposed in a car. The car audio system includes an audio input unit, a compensating audio signal source, a mixer, and a group of speakers. The compensating audio signal source provides a compensating audio signal according to the speed of the car. The mixer receives a main audio signal from the audio input unit and mixes the compensating audio signal with the main audio signal to generate a low-interference audio signal. The speakers receive and play the low-interference audio signal.

In an embodiment of the car audio system according to the present invention, the audio input unit is a broadcast receiver, a optical disk player, a call receiver, or an external audio input port.

As described above, in an audio system and an electronic device provided by the present invention, the interference to a user of an external speaker is reduced. In addition, in a car audio system provided by the present invention, the interference to a user of the car audio system from engine noise and wind noise is reduced.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
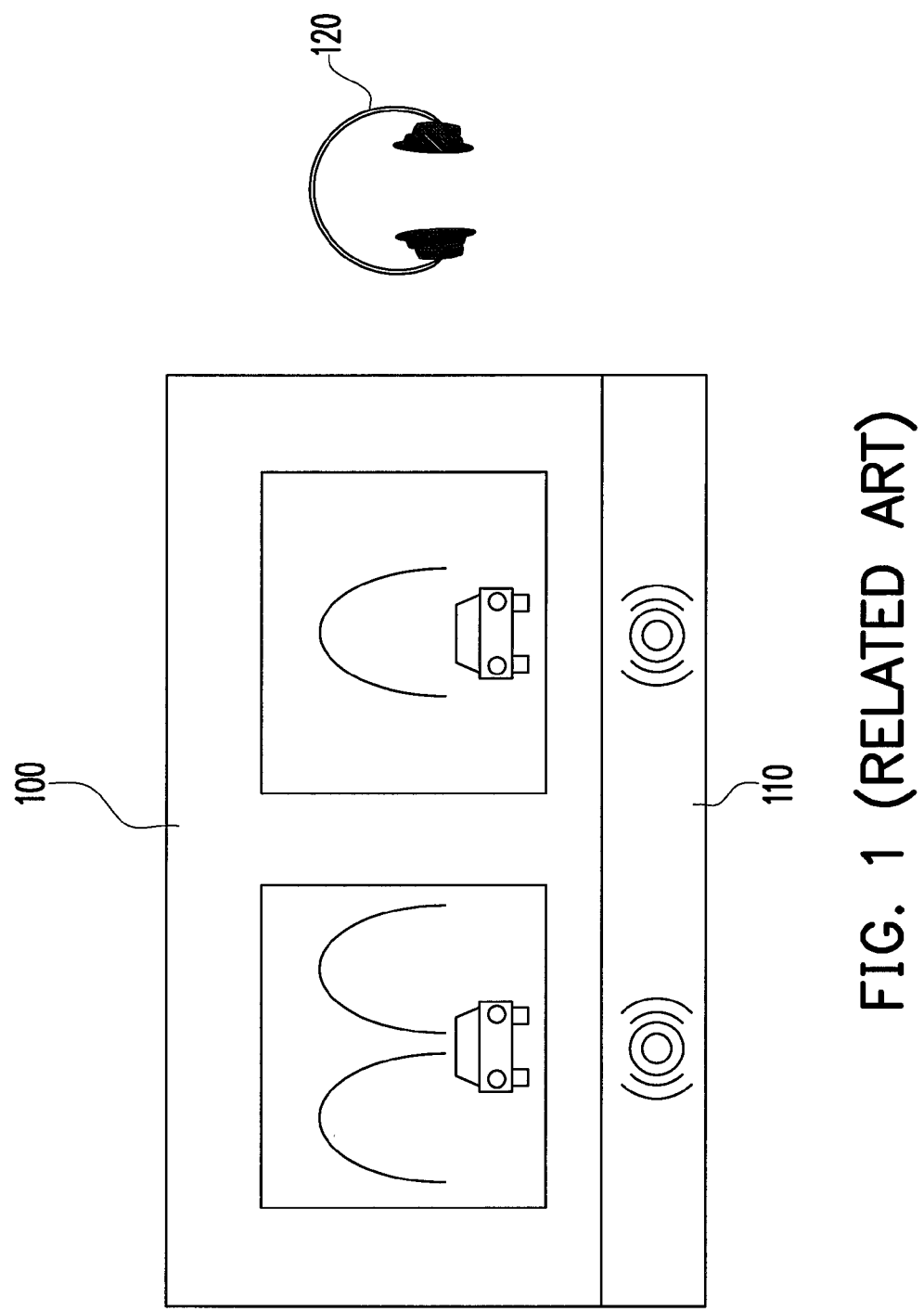
FIG. 1 is a diagram of a conventional TV.

Reference will now be made in detail to the present preferred embodiments of the invention, examples of which are illustrated in the accompanying drawings. Wherever possible, the same reference numbers are used in the drawings and the description to refer to the same or like parts.

Figure 2:
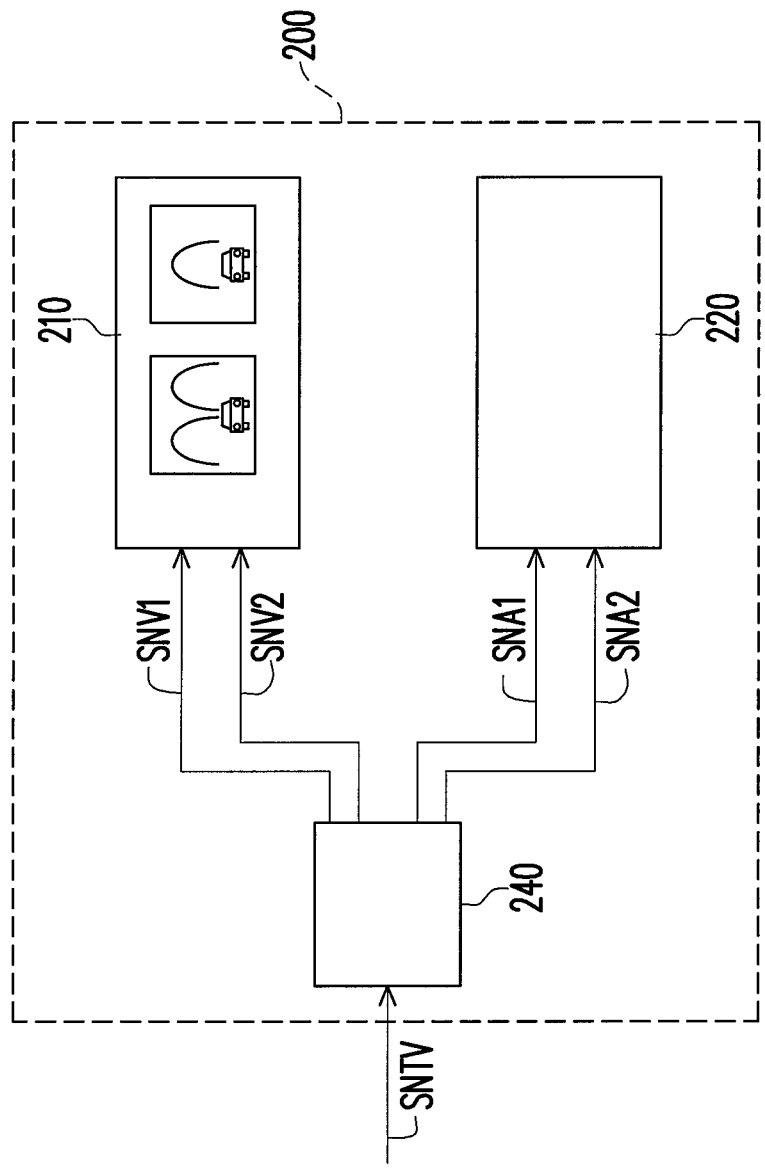
FIG. 2 is a diagram of an electronic device according to an embodiment of the present invention.

FIG. 2 is a diagram of an electronic device according to an embodiment of the present invention. In the present embodiment, the electronic device may be a TV. However, the electronic device in the present invention is not limited thereto. Referring to FIG. 2, the electronic device 200 includes a display unit 210, an audio system 220, and a tuner 240. The tuner 240 receives a signal SNTV from a signal source (not shown), wherein the signal SNTV is received from an external video input device, such as a TV, an AV device (for example, a CD player or a DVD player), or a computer system. In following description, the signal SNTV is assumed to be a television signal. The television signal SNTV contains a first video signal SNV1, a first audio signal SNA1, a second video signal SNV2, and a second audio signal SNA2, wherein the first audio signal SNA1 is corresponding to the first video signal SNV1, and the second audio signal SNA2 is corresponding to the second video signal SNV2. The display unit 210 simultaneously displays the first video signal SNV1 and the second video signal SNV2.

Figure 3A:
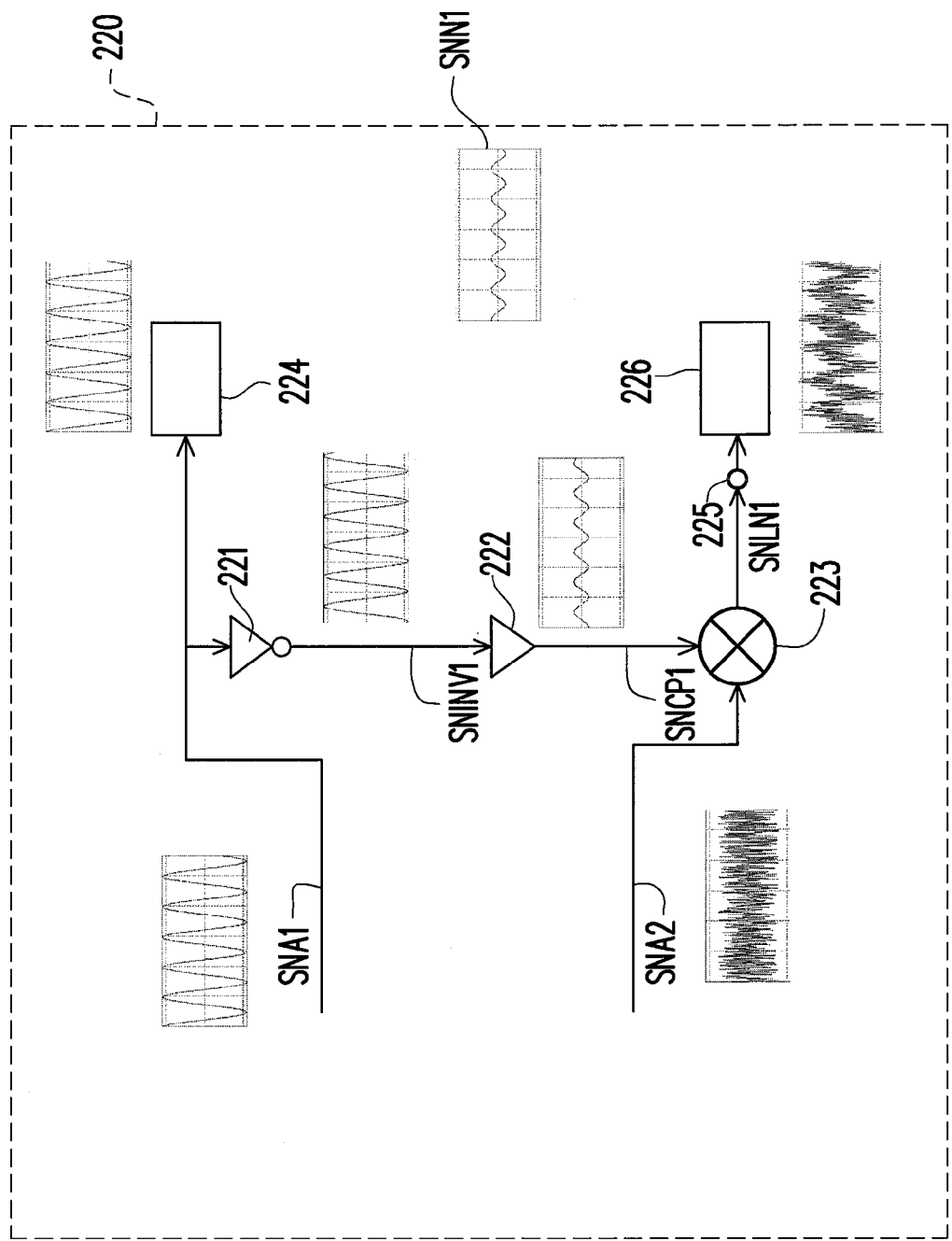
FIG. 3A is a diagram of an audio system according to an embodiment of the present invention.

FIG. 3A is a diagram of the audio system in FIG. 2. Referring to FIG. 2 and FIG. 3A, the audio system 220 includes an inverter 221, a first amplifier 222, a first mixer 223, a main speaker 224, and a first audio output port 225. The inverter 221 receives a first audio signal SNA1 corresponding to the first video signal SNV1 and inverts the first audio signal SNA1 into an inverted audio signal SNINV1. The first amplifier 222 receives the inverted audio signal SNINV1 from the inverter 221 and multiplies the inverted audio signal SNINV1 by a first gain to generate a first compensating audio signal SNCP1. The first mixer 223 receives a second audio signal SNA2 corresponding to the second video signal SNV2 and mixes the first compensating audio signal SNCP1 with the second audio signal SNA2 to generate a first low-interference audio signal SNLN1. The main speaker 224 receives and plays the first audio signal SNA1. The first audio output port 225 receives the first low-interference audio signal SNLN1 from the first mixer 223 and transmits the first low-interference audio signal SNLN1 to a first external speaker 226.

A user can receive the first low-interference audio signal SNLN1 through the first external speaker 226, and the waveform of the first low-interference audio signal SNLN1 is illustrated in FIG. 3A. Besides, the user also receives the first audio signal SNA1 played by the main speaker 224. However, due to the affection of the actual distance and the obstruction of other objects, the first audio signal SNA1 received by the user may be as the interference audio signal SNN1 in FIG. 3A. When the user receives the first low-interference audio signal SNLN1 and the interference audio signal SNN1 at the same time, the waveform of a sound received by the user is similar to that of the original second audio signal SNA2. Thus, the audio system 220 can reduce the interference received by the user of the first external speaker 226 from the main speaker 224. In addition, because the first compensating audio signal SNCP1 can be generated in advance according to the first audio signal SNA1, an instant and accurate interference cancelling effect can be provided to the user.

Figure 3B:
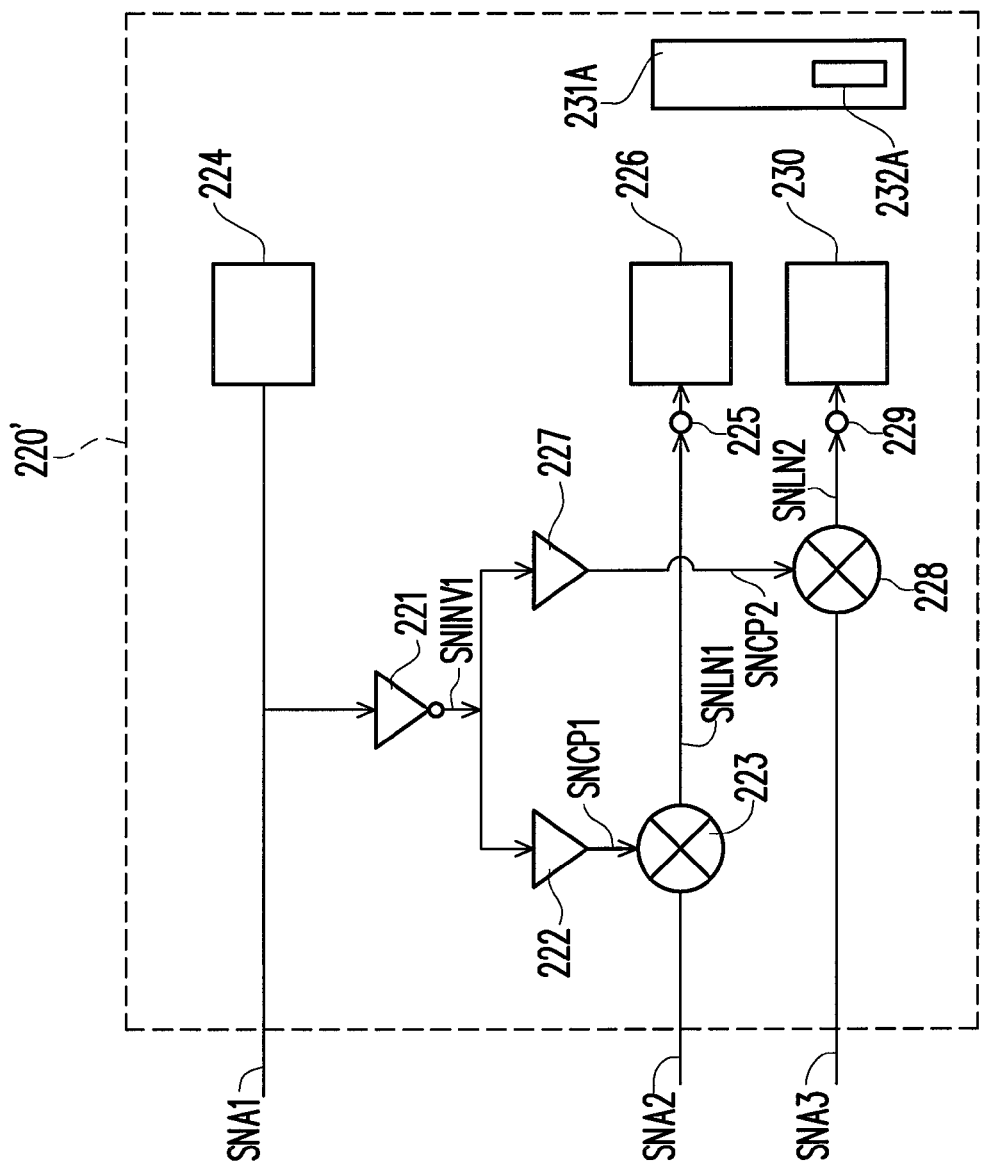
FIG. 3B is a diagram of an audio system according to another embodiment of the present invention.

FIG. 3B is a diagram of an audio system according to another embodiment of the present invention. Referring to FIG. 3B, the audio system 220' includes an inverter 221, a first amplifier 222, a first mixer 223, a main speaker 224, a first audio output port 225, a second amplifier 227, a second mixer 228, a second audio output port 229, and a controller 231A. The audio system 220' in the present embodiment is similar to the audio system 220 illustrated in FIG. 3A, and only the difference between the two will be described herein. The second amplifier 227 receives the inverted audio signal SNINV1 from the inverter 221 and multiplies the inverted audio signal SNINV1 by a second gain to generate a second compensating audio signal SNCP2. The second mixer 228 receives a third audio signal SNA3 and mixes the second compensating audio signal SNCP2 with the third audio signal SNA3 to generate a second low-interference audio signal SNLN2. The second audio output port 229 receives the second low-interference audio signal SNLN2 from the second mixer 228 and transmits the second low-interference audio signal SNLN2 to a second external speaker 230. The first external speaker 226 and the second external speaker 230 may be wired or wireless earphones, such as Bluetooth earphones. Similar to the previous embodiment, because the second low-interference audio signal SNLN2 output by the second audio output port 229 is a compensated signal, the interference from the main speaker 224 to the user of the second external speaker 230 is reduced. In other words, the audio system in the present invention can be applied to an electronic device having more sound tracks for reducing the interference received by the user of an external speaker.

In addition, the user of the first external speaker 226 and the second external speaker 230 may also change the first gain and the second gain by using the controller 231A to obtain an optimal interference compensation effect, and this can be accomplished by displaying an operation interface through the display unit 210 illustrated in FIG. 2. For example, if the distance between the user of an external speaker and the main speaker 224 increases, the corresponding gain is reduced; otherwise the corresponding gain is increased. Moreover, the controller 231A may have an audio receiving unit 232A for receiving the first audio signal SNA1 played by the main speaker 224, and the controller 231A changes the first gain and the second gain according to the volume of the first audio signal SNA1 received by the audio receiving unit 232A. Accordingly, the gains can be adjusted according to the distance between the controller 231A and the main speaker 224. Thus, the user can obtain the optimal interference compensation effect by placing the controller 231A right beside himself. The way of changing the gains by using the audio receiving unit 232A can be started by a user through operation of the controller 231A or automatically and constantly proceed by the controller 231A.

Figure 4:
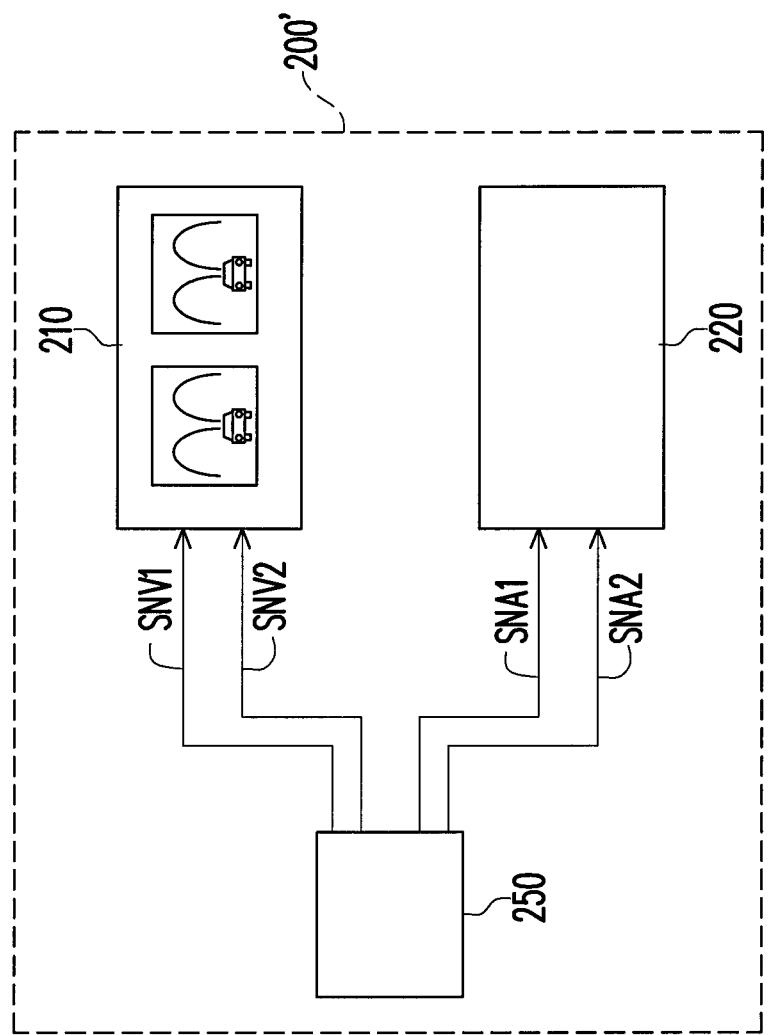
FIG. 4 is a diagram of an electronic device according to another embodiment of the present invention.

FIG. 4 is a diagram of an electronic device according to another embodiment of the present invention. Referring to FIG. 3A and FIG. 4, the electronic device 200' includes a display unit 210, an audio system 220, and a computer system 250. The electronic device 200' in the present embodiment is similar to the electronic device 200 illustrated in FIG. 2, and only the difference between the two will be described herein. In the electronic device 200' of the present embodiment, the first video signal SNV1, the second video signal SNV2, the first audio signal SNA1, and the second audio signal SNA2 are generated by a computer system 250. Namely, these signals are generated by reading video/audio files stored in the computer system 250. Besides, an audio signal generated by the computer system 250 may not be corresponding to any video signal. For example, the computer system 250 may simultaneously play a movie and a music. Herein the computer system 250 only generate a set of corresponding audio signal and video signal and another audio signal, while the audio system 220 can still reduce the interference between the two audio signals.

Figure 5:
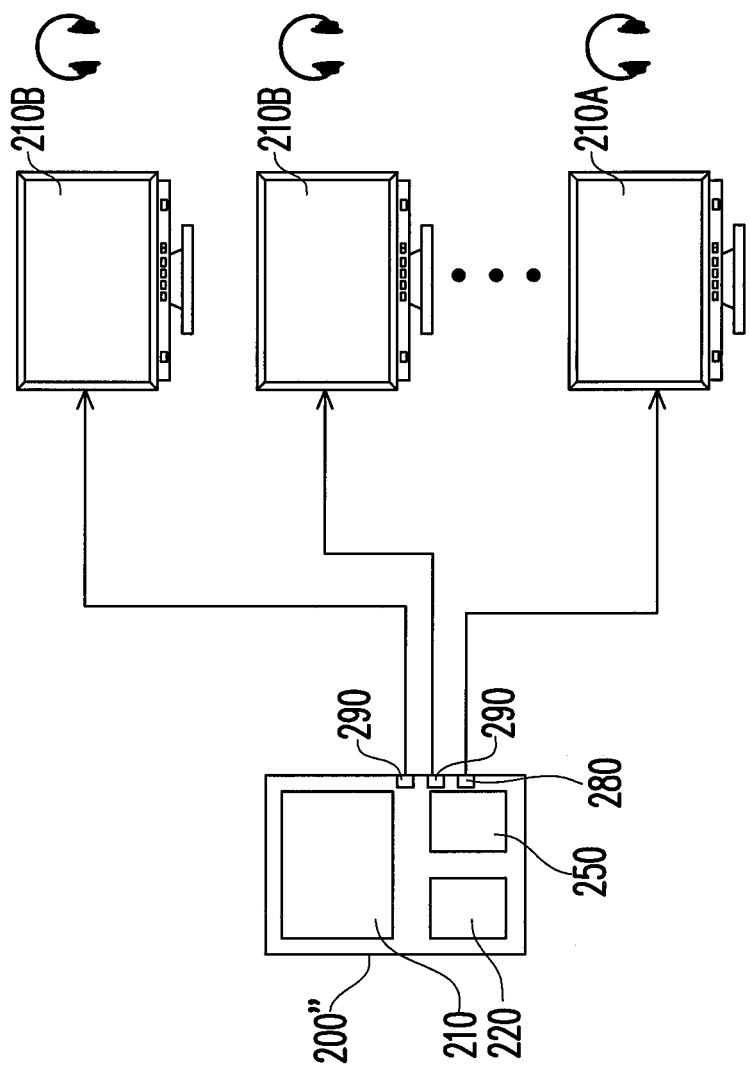
FIG. 5 is a diagram of an electronic device according to yet another embodiment of the present invention.

FIG. 5 is a diagram of an electronic device according to yet another embodiment of the present invention. The electronic device 200" includes a display unit 210, an audio system 220, a computer system 250, and a first video output port 280. The electronic device 200" in the present embodiment is similar to the electronic device 200' illustrated in FIG. 4, and only the difference between the two will be described herein. In the electronic device 200" of the present embodiment, the first video signal SNV1 is displayed by the display unit 210, and the second video signal SNV2 is sent to a first external display 210A through the first video output port 280 to be displayed. In the present embodiment, the electronic device 200" further includes a plurality of video output ports 290 such that when the computer system 250 generates more video signals, these video signals can be sent to other external displays 210B to be displayed. In addition, the audio signals corresponding to the video signals are also sent to the corresponding external speakers to be played.

Figure 6:
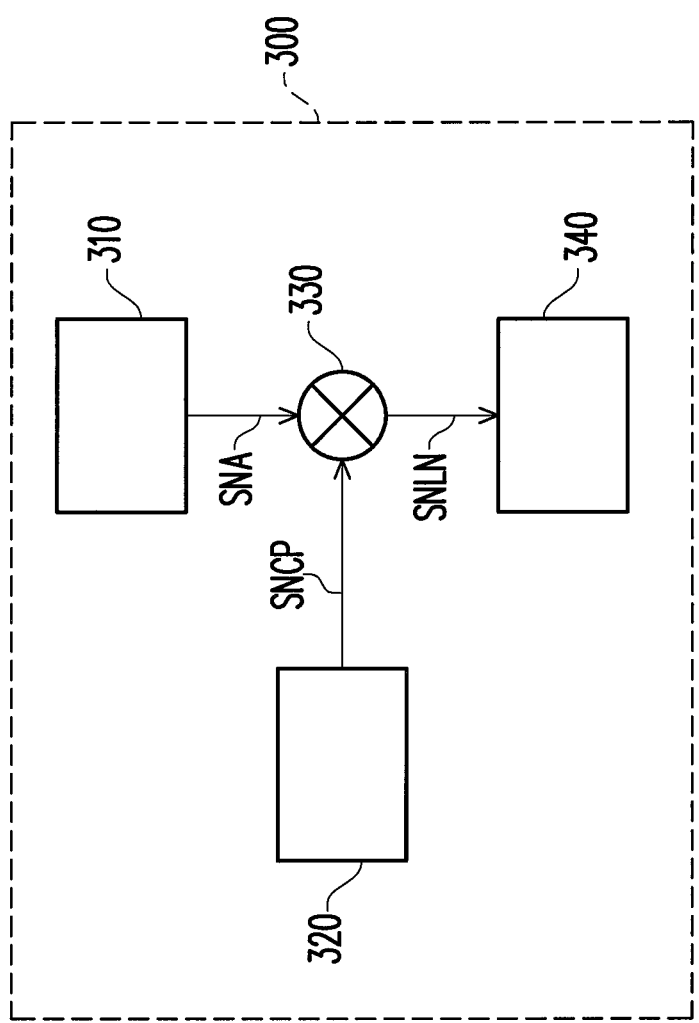
FIG. 6 is a diagram of a car audio system according to an embodiment of the present invention.

FIG. 6 is a diagram of a car audio system according to an embodiment of the present invention. The car audio system 300 is suitable for being disposed in a car (not shown). The car audio system 300 includes an audio input unit 310, a compensating audio signal source 320, a mixer 330, and a group of speakers 340. The audio input unit 310 may be a broadcast receiver, a optical disk player, a call receiver, an external audio input port, or other audio input units. In order to reduce the interference of traffic noises (for example, interference caused by engine noise or wind noise) to the driver and passengers of the car when they are using the car audio system 300, the compensating audio signal source 320 provides a corresponding compensating audio signal SNCP according to the speed of the car. The mixer 330 receives a main audio signal SNA from the audio input unit 310 and mixes the compensating audio signal SNCP with the main audio signal SNA to generate a low-interference audio signal SNLN. The speakers 340 receive and play the low-interference audio signal SNLN. Similar to the embodiments described above, because the low-interference audio signal SNLN played by the speakers 340 already contains the compensating audio signal SNCP, the interference caused by traffic noises can be cancelled by the compensating audio signal SNCP. Herein the compensating audio signal SNCP may be generated by the manufacturer according to the noise detected in the car at different driving speed, and accordingly compensating audio signals SNCP corresponding to different driving speeds are stored in the compensating audio signal source 320.

As described above, the present invention provides an audio system, an electronic device, and a car audio system, wherein a pre-obtained interference audio signal is inverted and multiplied by a gain to obtain a compensating audio signal, and the compensating audio signal is then mixed with an original audio signal to be played. Thereby, the interference audio signal is offset by a compensating audio signal so that the interference to a user is reduced.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:
1. An audio system, comprising:
an inverter, for receiving a first audio signal and inverting the first audio signal into an inverted audio signal;
a first amplifier, for receiving the inverted audio signal from the inverter and multiplying the inverted audio signal by a first gain to generate a first compensating audio signal;

a first mixer, for receiving a second audio signal and mixing the first compensating audio signal with the second audio signal to generate a first low-interference audio signal;

a main speaker, for receiving and playing the first audio signal;

a first audio output port, for receiving the first low-interference audio signal from the first mixer and transmitting the first low-interference audio signal to a first external speaker;

a second amplifier, for receiving the inverted audio signal from the inverter and multiplying the inverted audio signal by a second gain to generate a second compensating audio signal;

a second mixer, for receiving a third audio signal and mixing the second compensating audio signal with the third audio signal to generate a second low-interference audio signal; and a second audio output port, for receiving the second low-interference audio signal from the second mixer and transmitting the second low-interference audio signal to a second external speaker.

2. The audio system according to claim 1, wherein the first external speaker is an earphone.

3. The audio system according to claim 1, wherein the second external speaker is an earphone.

4. The audio system according to claim 1 further comprising a controller having an audio receiving unit, wherein the audio receiving unit receives the first audio signal played by the main speaker, and the controller changes the first gain according to a volume of the first audio signal received by the audio receiving unit.

5. The audio system according to claim 1 further comprising a controller, wherein a user uses the controller to change the first gain.

6. An electronic device, comprising:
a display unit, for displaying a first video signal; and
an audio system, comprising:
  an inverter, for receiving a first audio signal corresponding to the first video signal and inverting the first audio signal into an inverted audio signal;
  a first amplifier, for receiving the inverted audio signal from the inverter and multiplying the inverted audio signal by a first gain to generate a first compensating audio signal;
  a first mixer, for receiving a second audio signal and mixing the first compensating audio signal with the second audio signal to generate a first low-interference audio signal;
  a main speaker, for receiving and playing the first audio signal;
  a first audio output port, for receiving the first low-interference audio signal from the first mixer and transmitting the first low-interference audio signal to a first external speaker;
  a second amplifier, for receiving the inverted audio signal from the inverter and multiplying the inverted audio signal by a second gain to generate a second compensating audio signal;
  a second mixer, for receiving a third audio signal and mixing the second compensating audio signal with the third audio signal to generate a second low-interference audio signal; and
  a second audio output port, for receiving the second low-interference audio signal from the second mixer and transmitting the second low-interference audio signal to a second external speaker.

7. The electronic device according to claim 6, wherein the first external speaker is an earphone.

8. The electronic device according to claim 6, wherein the second external speaker is an earphone.

9. The electronic device according to claim 6 further comprising a tuner for receiving a television signal from a signal source, wherein the television signal comprises the first video signal, the first audio signal, a second video signal, and the second audio signal, the second video signal is corresponding to the second audio signal, and the display unit simultaneously displays the first video signal and the second video signal.

10. The electronic device according to claim 6 further comprising a computer system for generating the first video signal, the first audio signal, and the second audio signal.

11. The electronic device according to claim 10, wherein the computer system further generates a second video signal corresponding to the second audio signal, and the display unit simultaneously displays the first video signal and the second video signal.

12. The electronic device according to claim 10 further comprising a first video output port, wherein the computer system further generates a second video signal corresponding to the second audio signal, and the first video output port receives the second video signal from the computer system and transmits the second video signal to a first external display.

13. The electronic device according to claim 6, wherein the audio system further comprises a controller having an audio receiving unit, the audio receiving unit receives the first audio signal played by the main speaker, and the controller changes the first gain according to a volume of the first audio signal received by the audio receiving unit.

14. The electronic device according to claim 6, wherein the audio system further comprises a controller, and a user uses the controller to change the first gain.

* * * * *